(12) United States Patent
Salzer

(10) Patent No.: US 11,767,119 B2
(45) Date of Patent: Sep. 26, 2023

(54) SEAT SYSTEM HAVING A CANTED LEG ASSEMBLY

(71) Applicant: HAECO Americas, LLC, Greensboro, NC (US)

(72) Inventor: Uwe Salzer, Greensboro, NC (US)

(73) Assignee: HAECO Americas, LLC, Greensboro, NC (US)

( * ) Notice: Subject to any disclaimer, the term of this patent is extended or adjusted under 35 U.S.C. 154(b) by 130 days.

(21) Appl. No.: 17/191,802

(22) Filed: Mar. 4, 2021

(65) Prior Publication Data

US 2021/0387732 A1    Dec. 16, 2021

Related U.S. Application Data

(60) Provisional application No. 63/039,696, filed on Jun. 16, 2020.

(51) Int. Cl.
*B64D 11/06* (2006.01)

(52) U.S. Cl.
CPC ...... *B64D 11/0639* (2014.12); *B64D 11/0601* (2014.12); *B64D 11/0638* (2014.12); *B64D 11/0648* (2014.12); *B64D 11/0696* (2013.01)

(58) Field of Classification Search
CPC ............ B64D 11/0639; B64D 11/0601; B64D 11/0638; B64D 11/0648; B64D 11/0696
See application file for complete search history.

(56) References Cited

U.S. PATENT DOCUMENTS

| | | | | |
|---|---|---|---|---|
| 6,644,738 B2* | 11/2003 | Williamson | ....... | B64D 11/0638 297/216.2 |
| 6,672,661 B2 | 1/2004 | Williamson | | |
| 7,959,034 B2* | 6/2011 | Faaborg | ................ | B65D 47/06 222/111 |
| 11,040,775 B2* | 6/2021 | Wong | ................... | B64D 11/064 |
| 2019/0283644 A1* | 9/2019 | Smith | .................... | B60N 3/004 |
| 2020/0307417 A1* | 10/2020 | Oman | .................. | H02G 3/0437 |

FOREIGN PATENT DOCUMENTS

GB          817263         7/1959

* cited by examiner

*Primary Examiner* — Brady W Frazier
*Assistant Examiner* — Nevena Aleksic
(74) *Attorney, Agent, or Firm* — MacCord Mason PLLC

(57) ABSTRACT

A seat system for a passenger aircraft. The seat system includes a passenger seat frame (i) a plurality of spreader bars and (ii) a plurality of laterally extending spar tubes connecting the plurality of spreader bars to one another and at least one canted leg assembly connected to the seat frame for attachment to fixed, spaced apart attachment points on a supporting surface of the passenger aircraft. The canted leg assembly includes: (i) a front leg portion including a front joint clamp for receiving one of the plurality of laterally extending spar tubes in a non-perpendicular attachment point; and (ii) an aft leg portion including an aft joint clamp for receiving another one of the plurality of laterally extending spar tubes in a non-perpendicular attachment point, whereby the seat system is adapted to be laterally positioned and attached to provide different spaced apart passenger seating configurations. A seat back tray table may be attached to the back of the passenger seat frame.

18 Claims, 9 Drawing Sheets

SEAT SYSTEM HAVING A CANTED LEG ASSEMBLY

This application claims priority to U.S. Provisional application No. 63/039,696, filed Jun. 16, 2020, which is incorporated herein by reference in its entirety.

BACKGROUND OF THE INVENTIONS

(1) Field

The present inventions relates generally to seat systems for passenger vehicles and, more particularly, to a seat system for a passenger aircraft.

(2) Related Art

The present inventions relate to vehicle seats and, especially to seats of the type generally used in aircraft which may have a reclinable backrest. Aircraft passenger seats are constructed from modular components, the size, weight and construction of which are dictated by many considerations, including fuselage dimensions, aesthetic and safety considerations. Many of these requirements are imposed by law or regulation.

The lower seat chassis is constructed of leg assemblies, while the upper seat is constructed of spreader bars. The leg assemblies and spreader bars are connected by mounting both to a series of parallel beams which extend laterally from one side of the seat or seat assembly to the other.

The location of the upper seat section modules is constrained by the aircraft fuselage lines, statutory aisle requirements and carrier preferences within these parameters. The location of the leg assemblies is governed by the positions of the floor tracks which extend along the length of the fuselage and to which the seats are secured by track fittings on the bottom of the leg assemblies. The position of the floor tracks is generally fixed and permanent.

The variable position of the seats and the fixed lateral location of the legs relative to the floor tracks thus has required the fabrication of numerous specialty parts intended particularly for a given seat for a given location in combination with aisle and seat place widths. Many of these parts are fabricated for a specific location by the placement of holes in the components to attach them together, rendering them unusable in other positions within the aircraft. Such designs may produce waste and inefficiency.

One approach to a more universal system is shown in U.S. Pat. No. 6,644,738 issued Nov. 11, 2003 to Williamson which is hereby incorporated by reference in its entirety. Williamson '738 discloses a passenger seat frame assembly, including a seat bottom chassis including a plurality of leg assemblies and spreader bars. The leg assemblies are attached to fixed, spaced-apart attachment points on a supporting surface, such as the deck of an aircraft fuselage. A plurality of spar tubes are carried by the leg assemblies and spreader bars. A plurality of clamp joints are provided for being positioned on the plurality of leg assemblies and for receiving the plurality of spar tubes in spaced-apart relation to each other for defining a ladder frame assembly having a specified width and seat spacing. Such designs may result in a weight penalty and do include additional fasteners which must be accounted for.

Thus, there remains a need for a seat system having a canted leg assembly whereby the seat system is adapted to be laterally positioned and attached to provide different spaced apart passenger seating configurations while, at the same time, does not require additional parts or the weight of such additional parts.

SUMMARY OF THE INVENTIONS

The present inventions are directed to a seat system for a passenger aircraft. The seat system includes a passenger seat frame having (i) a plurality of spreader bars and (ii) a plurality of laterally extending spar tubes connecting the plurality of spreader bars to one another and at least one canted leg assembly connected to the seat frame for attachment to fixed, spaced apart attachment points on a supporting surface of the passenger aircraft. The canted leg assembly includes: (i) a front leg portion including a front joint clamp for receiving one of the plurality of laterally extending spar tubes in a non-perpendicular attachment point; and (ii) an aft leg portion including an aft joint clamp for receiving another one of the plurality of laterally extending spar tubes in a non-perpendicular attachment point, whereby the seat system is adapted to be laterally positioned and attached to provide different spaced apart passenger seating configurations. A seat back tray table also may be attached to the back of the passenger seat frame.

In one embodiment, each of the joint clamps include an annular collar for receiving the spar tubes. In one embodiment, the interior portion of the annular collar is beveled off center to vertical from one side of the collar to form the non-perpendicular attachment point. In still another embodiment, the interior portion of the annular collar is also beveled off center to vertical from the other side of the collar to form another and opposite of the non-perpendicular attachment point for canting the leg assemblies in the opposite direction. Finally, at least one of the annular collars may be a split collar.

The canted leg assembly may further include a floor tie assembly connecting the base of the front leg portion to the base of the aft leg portion. In one embodiment, the floor tie assembly further includes a front track fitting. The floor tie assembly may further include an aft track fitting. Finally, the floor tie assembly may further include a seat track cover.

The seat back tray table attached to the back of the passenger seat frame may be movable between a first storage position and a second deployed position. In one embodiment, a lock mechanism is attached to the back of the passenger seat frame for retaining the seat back tray table in a secured position.

In one embodiment, the passenger seat may further include a display attached to the back of the passenger seat. The display may be adjoined by the back of the passenger seat.

The seat system may further include a backrest support assembly including a backrest attached to one of the spreader bars. The seat system may further include a seat bottom support assembly. The seat system may also further include a quadrant assembly connected between the backrest support assembly and the seat bottom support assembly comprising a quadrant member including (i) a pivot point adapted to pivot the backrest with respect to the spreader and the quadrant member; (ii) a lower attachment point attached to the seat bottom support assembly and (iii) an upper attachment point attached to the backrest.

A backrest cushion may be attached to the backrest support assembly. The backrest support assembly may further include a headrest. In one embodiment, the headrest is adjustable to accommodate for the height of a passenger.

The passenger seat may further include an upholstered package. In addition, the passenger seat may further include a trim package.

Accordingly, one aspect of the present inventions is to provide a seat system for a passenger aircraft, the seat system including (a) a passenger seat frame having (i) a plurality of spreader bars and (ii) a plurality of laterally extending spar tubes connecting the plurality of spreader bars to one another; and (b) at least one canted leg assembly connected to the seat frame for attachment to fixed, spaced apart attachment points on a supporting surface of the passenger aircraft, whereby the seat system is adapted to be laterally positioned and attached to provide different spaced apart passenger seating configurations.

Another aspect of the present inventions is to provide in a seat system for a passenger aircraft wherein the seat system includes a passenger seat frame having (i) a plurality of spreader bars and (ii) a plurality of laterally extending spar tubes connecting the plurality of spreader bars to one another, the improvement including a canted leg assembly connected to the seat frame for attachment to fixed, spaced apart attachment points on a supporting surface of the passenger aircraft, the canted leg assembly comprising: (a) a front leg portion including a front joint clamp for receiving one of the plurality of laterally extending spar tubes in a non-perpendicular attachment point; and (b) an aft leg portion including an aft joint clamp for receiving another one of the plurality of laterally extending spar tubes in a non-perpendicular attachment point, whereby the seat system is adapted to be laterally positioned and attached to provide different spaced apart passenger seating configurations Still another aspect of the present inventions is to provide a seat system for a passenger aircraft, the seat system including (a) a passenger seat frame having (i) a plurality of spreader bars and (ii) a plurality of laterally extending spar tubes connecting the plurality of spreader bars to one another; (b) at least one canted leg assembly connected to the seat frame for attachment to fixed, spaced apart attachment points on a supporting surface of the passenger aircraft, the canted leg assembly including: (i) a front leg portion including a front joint clamp for receiving one of the plurality of laterally extending spar tubes in a non-perpendicular attachment point; and (ii) an aft leg portion including an aft joint clamp for receiving another one of the plurality of laterally extending spar tubes in a non-perpendicular attachment point, whereby the seat system is adapted to be laterally positioned and attached to provide different spaced apart passenger seating configurations; and (c) a seat back tray table attached to the back of the passenger seat frame.

These and other aspects of the present inventions will become apparent to those skilled in the art after a reading of the following description of the preferred embodiment when considered with the drawings.

DESCRIPTION OF THE EMBODIMENTS

Figure 1:
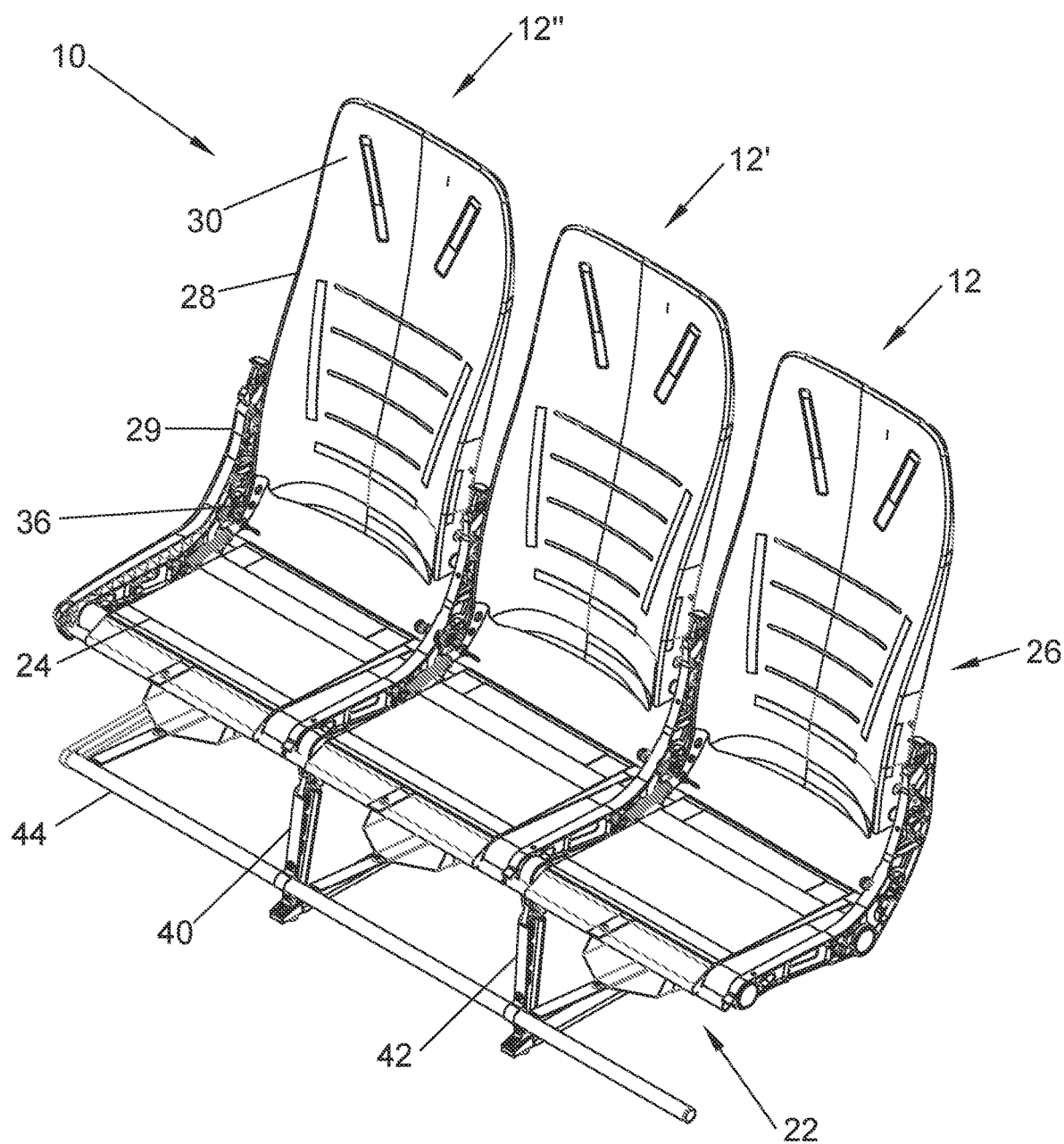
FIG. 1 is an overhead perspective view of one embodiment of a seat system constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the inventions and are not intended to limit the inventions thereto. As best seen in FIG. 1, a seat system, generally designated 10, is shown constructed according to the present inventions. The seat system 10 includes at least one passenger seat 12.

Each of the passenger seats 12 may include a passenger seat frame 22, a seat bottom support assembly 24 attached to the passenger seat frame and a backrest support assembly 26 attached to the passenger seat frame 22 adjoining the seat bottom support assembly 24. The backrest support assembly 26 may further include a headrest 30. In one embodiment headrest 30 is adjustable to accommodate the height of a passenger. The backrest support assembly 26 includes a backrest 28 that may tilt with respect to spreader bar 29 by pivoting along quadrant assembly 36.

Figure 2:
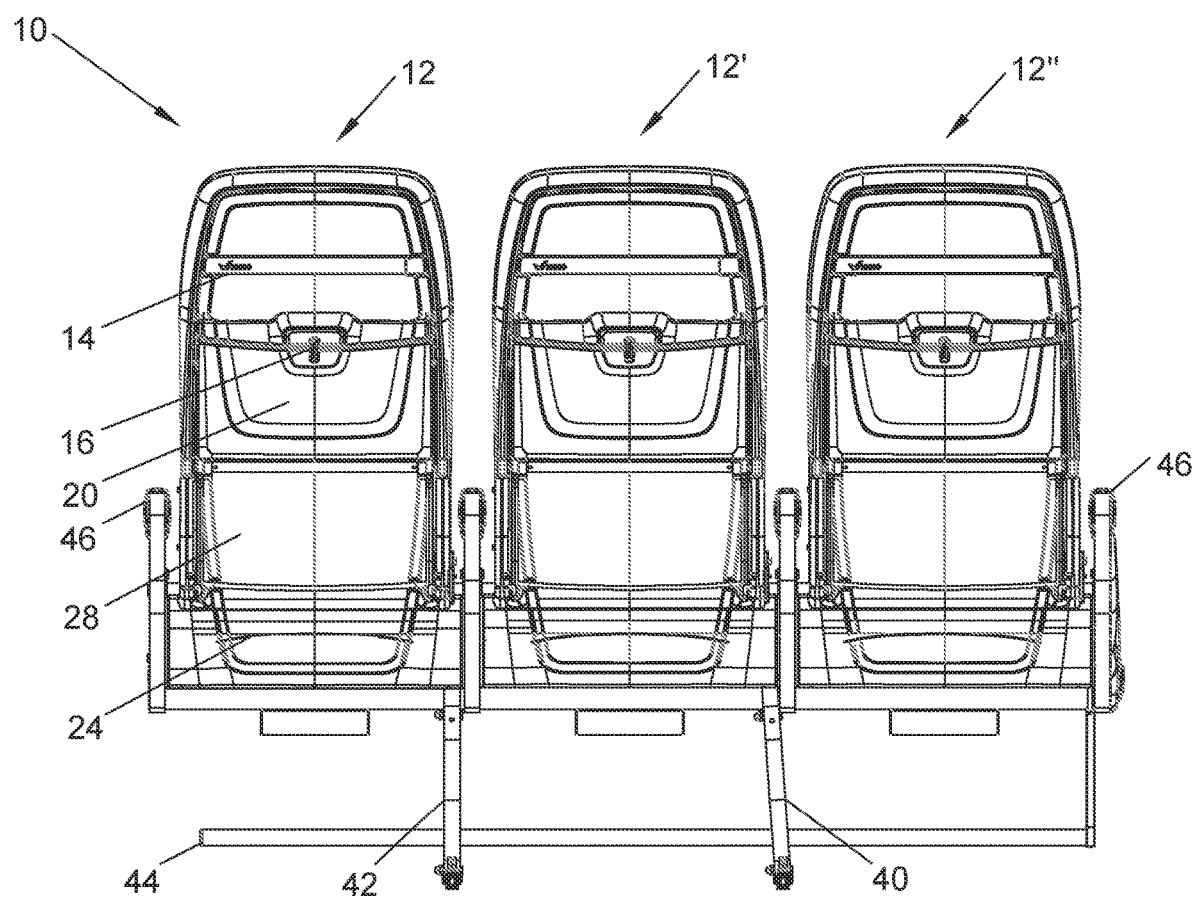
FIG. 2 is a rear elevational view of one embodiment of a seat system constructed according to the present inventions.

Turning to FIG. 2, there is shown a rear view of the seat system 10 constructed according to the present inventions. A seat back bezel 14 is attached to the back of the passenger seat 12. The seat back bezel 14 may adjoin a seat back tray table 20 attached to the back of passenger seat 12.

Figure 3:
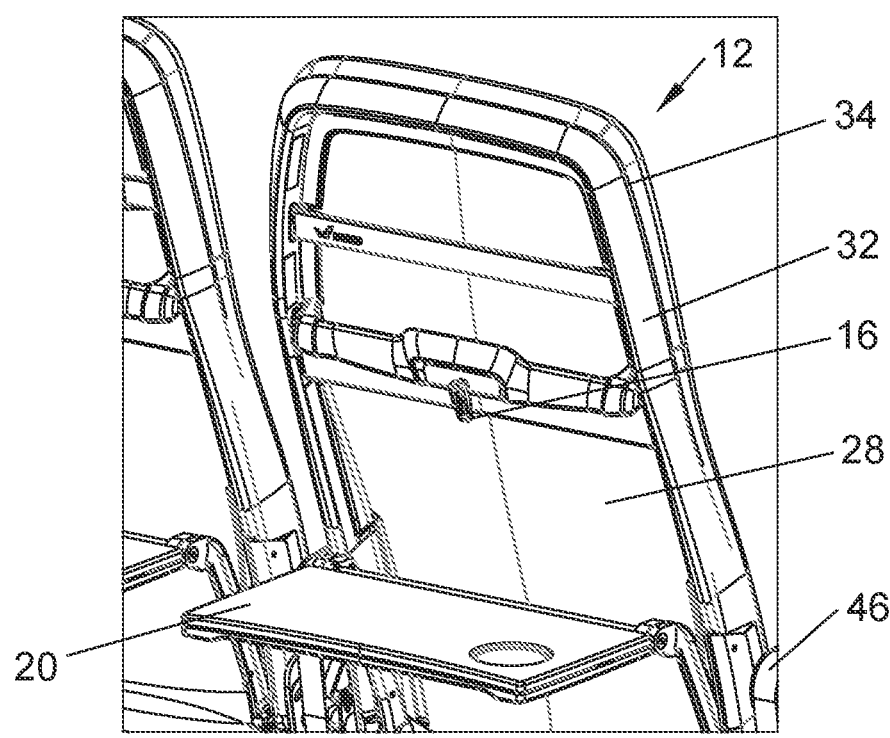
FIG. 3 is an enlarged back elevational view of FIG. 2 with the seat back tray deployed.

As best seen in FIG. 3, the seat back tray table 20 attached to the back of the passenger seat 12 is movable between its first storage position and a second deployed position. A lock mechanism 16 attached to the back of the seat back bezel 14 is adapted to retain the seat back tray table 20 in its secured position. The passenger seat 12 normally has a headrest closeout panel such as shown in FIGS. 2 and 3 but other embodiments may further include a display attached to the back of the passenger seat 12. The display may adjoin the seat back bezel 14. The passenger seat 12 may further include an upholstery package generally designated 32 and may also include a trim package generally designated 34.

Figure 4:
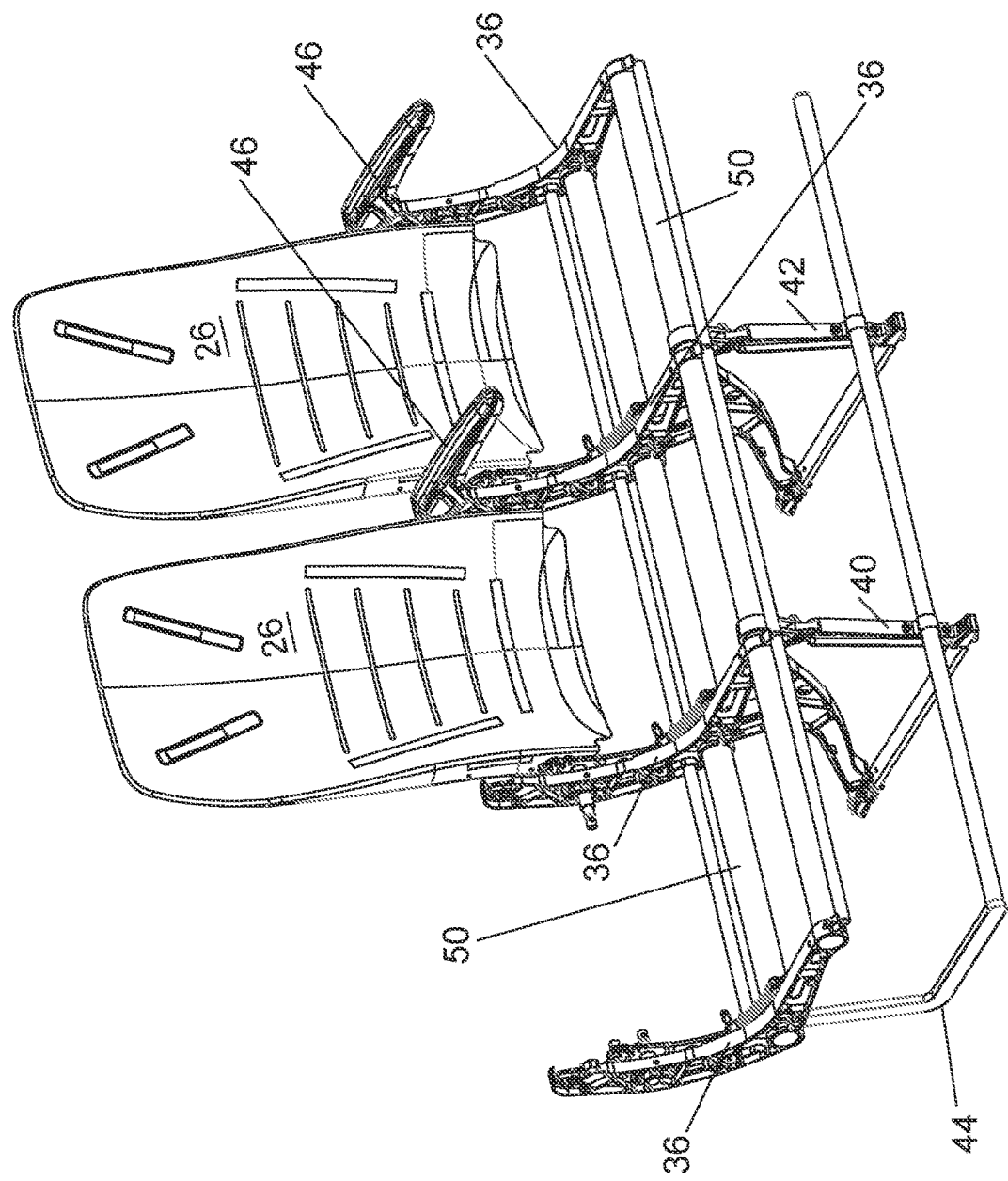
FIG. 4 is fragmentary perspective view of the seat system with parts, including the upholstery and cushions, removed for clarity.

In the specific embodiment shown in FIG. 4, the seat system 10 is comprised of three adjacent seats, an aisle seat 12", a center seat 12' and a window seat 12. The seat system 10 is supported on a pair of leg assemblies 40, 42 and includes a baggage guard rail 44. The seats 12", 12' and 12 are provided with arm rests 46. The seats 12", 12' and 12 include seat bottom support assemblies 22 and backrest support assemblies 26.

The internal structure of the seat system 10 is shown in FIG. 4, with various parts eliminated for clarity. As is shown, the seat system 10 is supported on and thus shares the two leg assemblies 40 and 42. The leg assemblies 40, 42 carry a set of laterally-extending spar tubes 50 on which are mounted spreader bars 29. The leg assemblies 40, 42, spar tubes 50; and the spreader bars 29 tie together the components in a manner necessary to form a seat system 10 having significant structural integrity within passenger comfort, fuselage size and government regulation requirements.

The underlying structure defined by leg assemblies 40, 42; spar tubes 50; and the spreader bars 29 is referred to as a "ladder frame assembly" The passenger seat frame 22 carries seat backrest support assemblies 26 and seat bottom support assemblies 24.

The seats according to the present inventions can be integrated together to form seat systems of different lengths, spacings, and numbers of seats. Whether one, two, three or more seats, each seat system 10 will include at least two leg assemblies, such as leg assemblies 40, 42. Thus, when a seat is referred to as having a pair or a plurality of leg assemblies, it is understood that at least two leg assemblies are required, but that the two leg assemblies may not necessarily be on opposing sides of any particular seat.

For example, the three seats 12", 12' and 12 are each supported on two leg assemblies 40, 42. Thus, seat 12" is supported on two leg assemblies 40, 42, just as are seats 12' and 12, and whether the seat system 10 is considered a "seat" or the three seats 12", 12' and 12 are considered "seats", in either case they are supported by a plurality of legs.

FIG. 4 also illustrates one embodiment of a quadrant assembly 36 for use with the present inventions. Quadrant assembly 36 includes a quadrant member having a pivot point, a lower attachment point and an upper attachment point. Pivot point is adapted to enable backrest 28 to pivot with respect to spreader bars 29 and quadrant assembly 36. Lower attachment point attaches to seat bottom support assembly 24, and upper attachment point attaches to backrest 28. The upper attachment point is adapted for preventing the backrest from tilting forward unless a threshold amount of force is applied to backrest 28.

Figure 5:
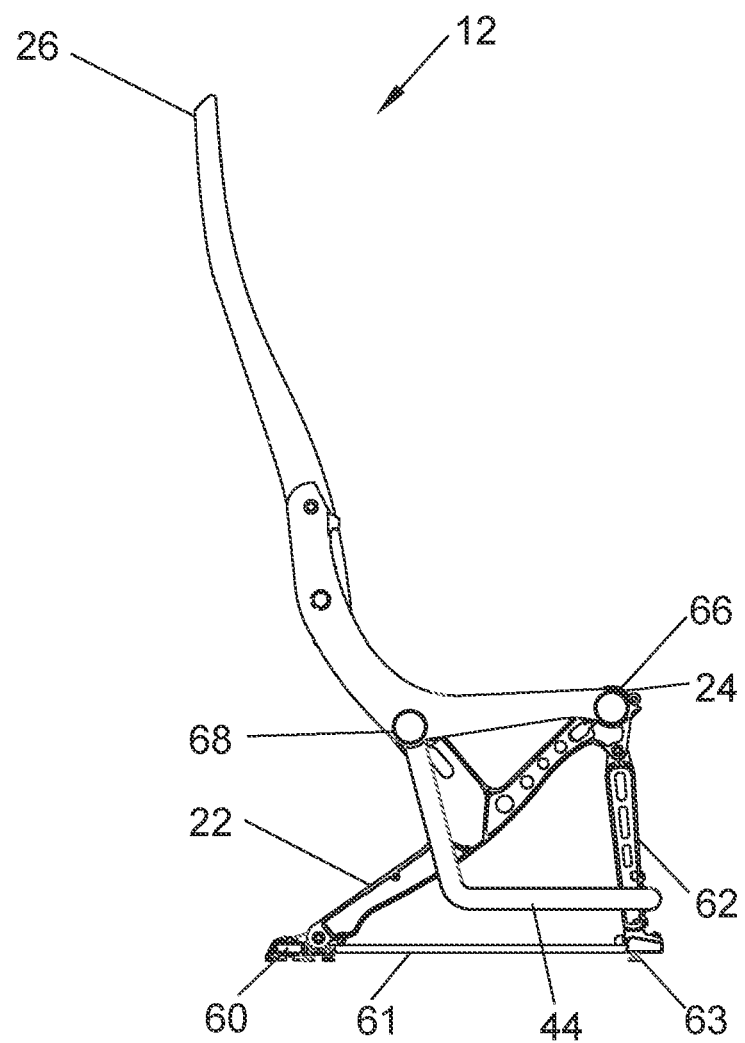
FIG. 5 is a fragmentary side elevation view of the aisle seat shown in FIG. 3 with parts, including the upholstery and cushions, removed for clarity.

FIG. 5 is a fragmentary side elevation view of the aisle seat shown in FIG. 3 with parts, including the upholstery and cushions, removed for clarity.

Figure 6:
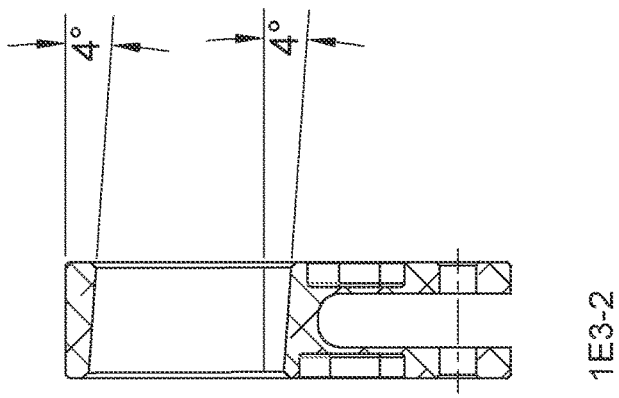
FIG. 6 is an enlarged side elevation view of the diagonal leg tie shown in FIG. 5 including cross-sectional views of the non-perpendicular joint clamp assemblies.
Figure 6:
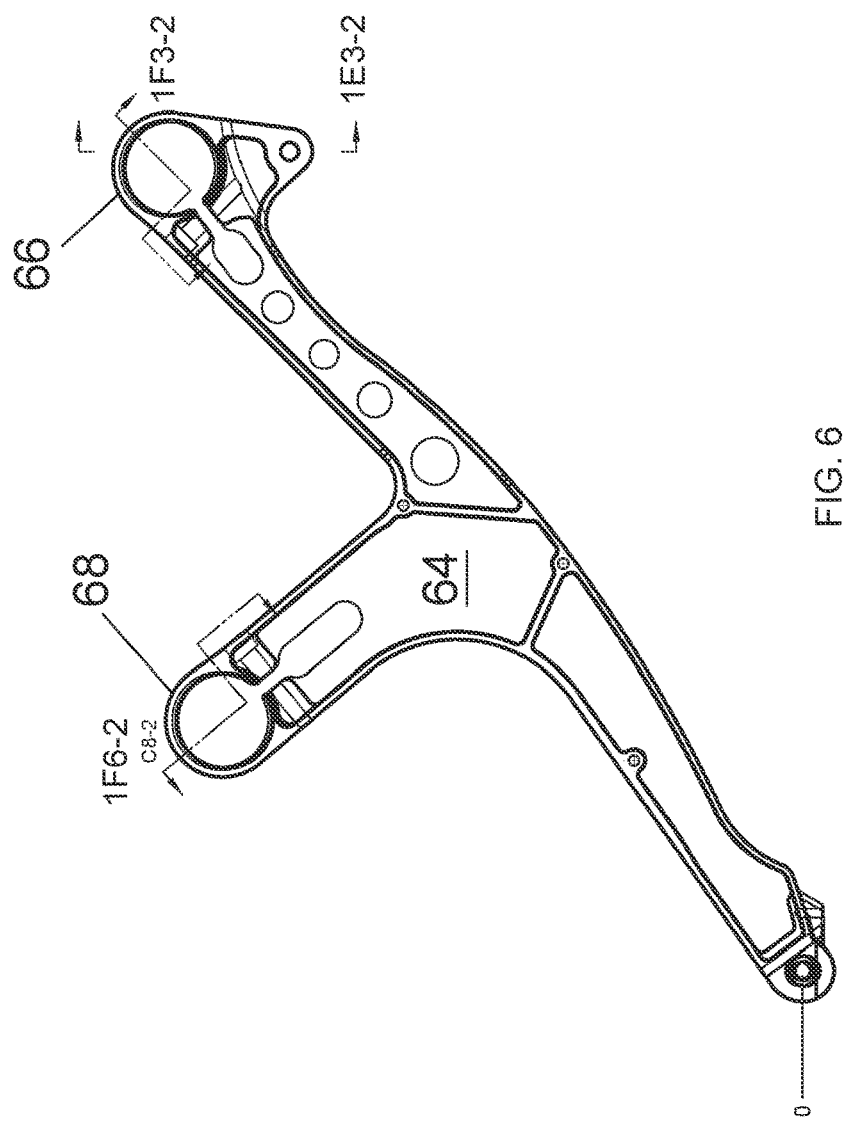
Figure 6:
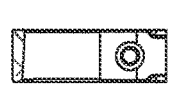
Figure 6:
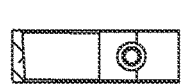

FIG. 6 is an enlarged side elevation view of the diagonal leg tie 64 shown in FIG. 5 including cross-sectional views of the non-perpendicular joint clamp assemblies 66, 68. In the embodiment shown in FIG. 6, the non-perpendicular aligned joint clamps 66, 68 are canted to position the leg assemblies 40, 42 about 4 degrees. A better understanding of how each of the components of the passenger seat frame 22 are attached to one another is shown in FIG. 7 discussed below.

Figure 7:
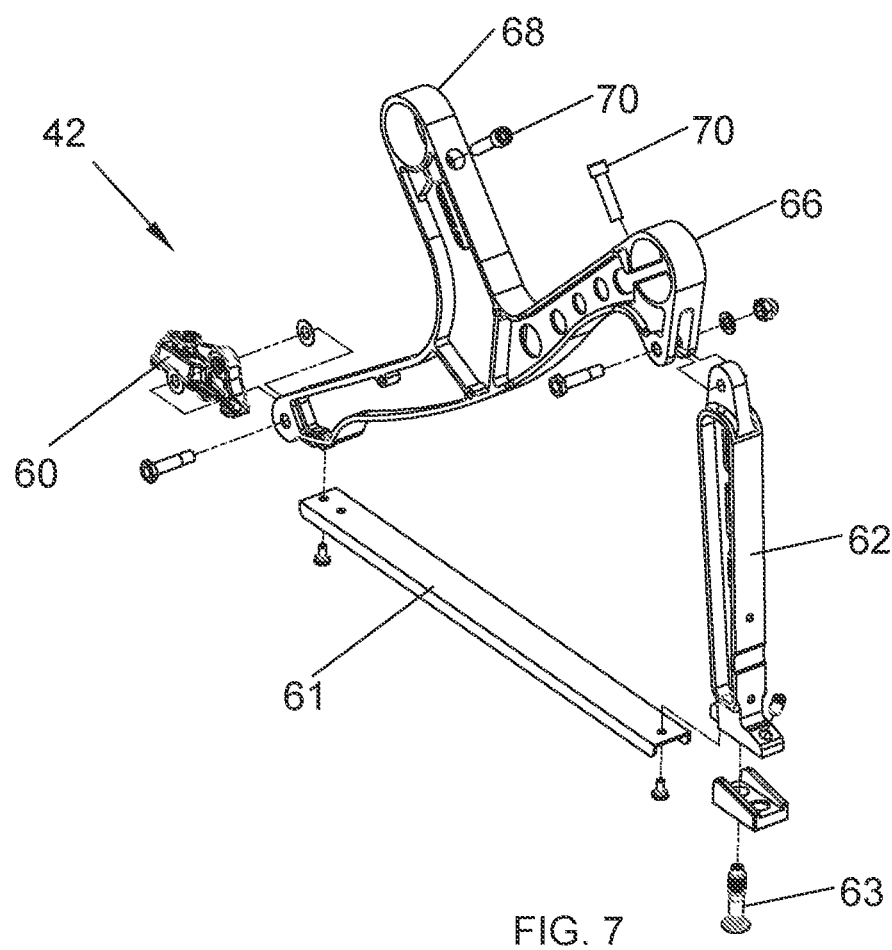
FIG. 7 is an exploded view of a canted leg assembly including a diagonal leg tie having non-perpendicular joint clamp assemblies according to an embodiment of the present inventions.

Referring now to FIG. 7, a canted leg assembly 40 constructed according to the present inventions is described in further detail Canted leg assembly 40 includes a rear floor track fitting 60 by which the seat system 10 is attached to a track extending along the fuselage deck from front to rear, a floor tie assembly 61, a front leg 62, a front track fitting 63, and a diagonal leg tie 64. The diagonal leg tie 64 includes a pair of joint clamps 66, 68 which include annular collars which are canted non-perpendicular in this embodiment shown by about 5 degrees to receive the spar tubes 50 by which the non-perpendicular aligned joint clamps 66, 68 are attached to the canted leg assembly 40.

Also, in the embodiment shown in FIG. 7, the non-perpendicular aligned joint clamps 66, 68 are formed as one piece with the diagonal leg tie 64. The diagonal leg tie 64 is secured by fasteners to the top of the front leg 62 and the aft track fitting 60 and the floor tie assembly 61. The non-perpendicular aligned joint clamps 66, 68 include axially-extending splits, which permit the collars to be spread sufficiently to permit insertion of the spar tubes 50. Fasteners 100 permit the collars to be tightened for locking the spar tubes 50 in place in a predetermined position and loosened for permitting the spar tubes 50 to the removed from or shifted axially within the collars.

As shown in FIGS. 2, 4 and 7, the spreader bars 29 are mounted to the spar tubes 50 in a non-perpendicular alignment relative the leg assemblies 40, 42 and form the passenger seat frame 22. A better understanding of how each of the components of the passenger seat frame 22 may be attached to one another for specific applications is shown in FIGS. 8-10 discussed below.

Figure 8:
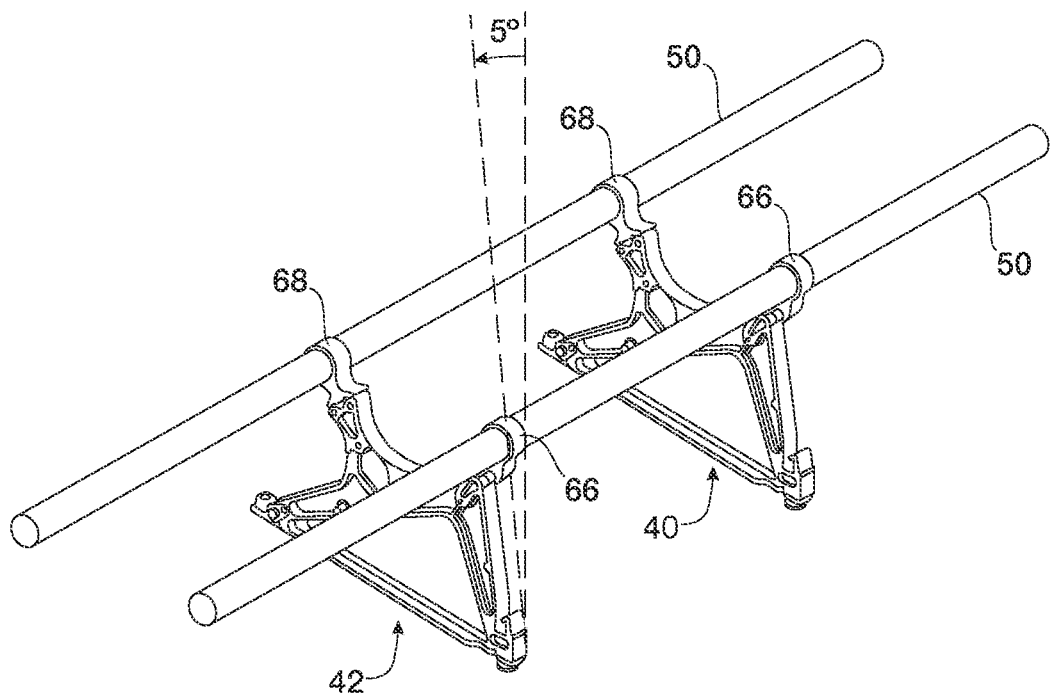
FIGS. 8-10 illustrate different non-perpendicular alignments which are possible using two variations of the canted leg assembly shown in FIG. 7.
Figure 9:
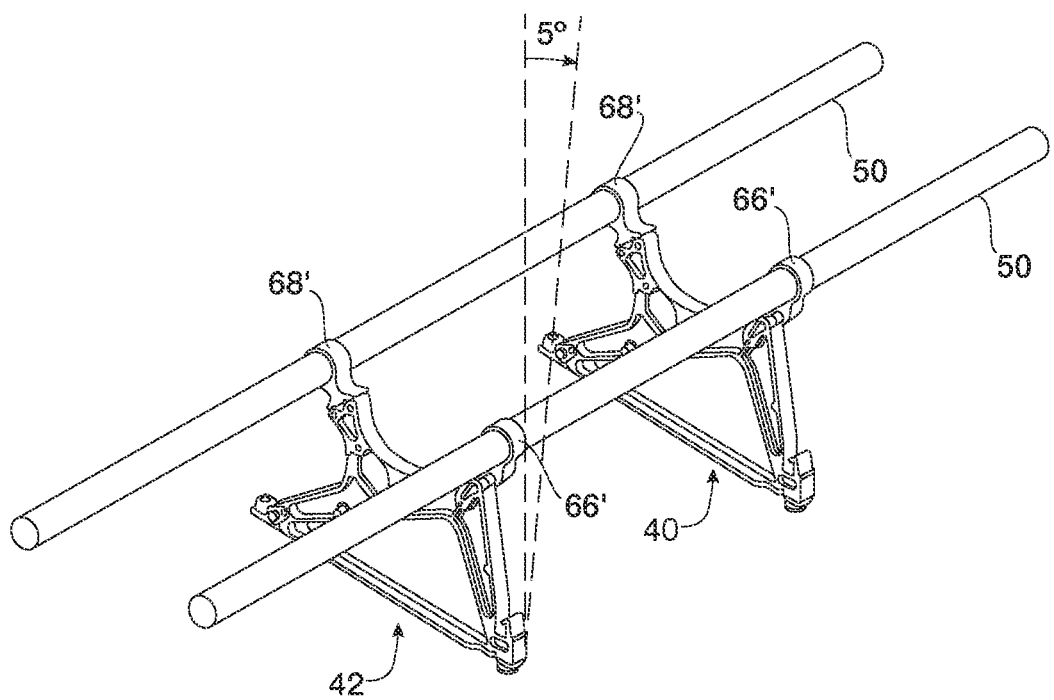
Figure 10:
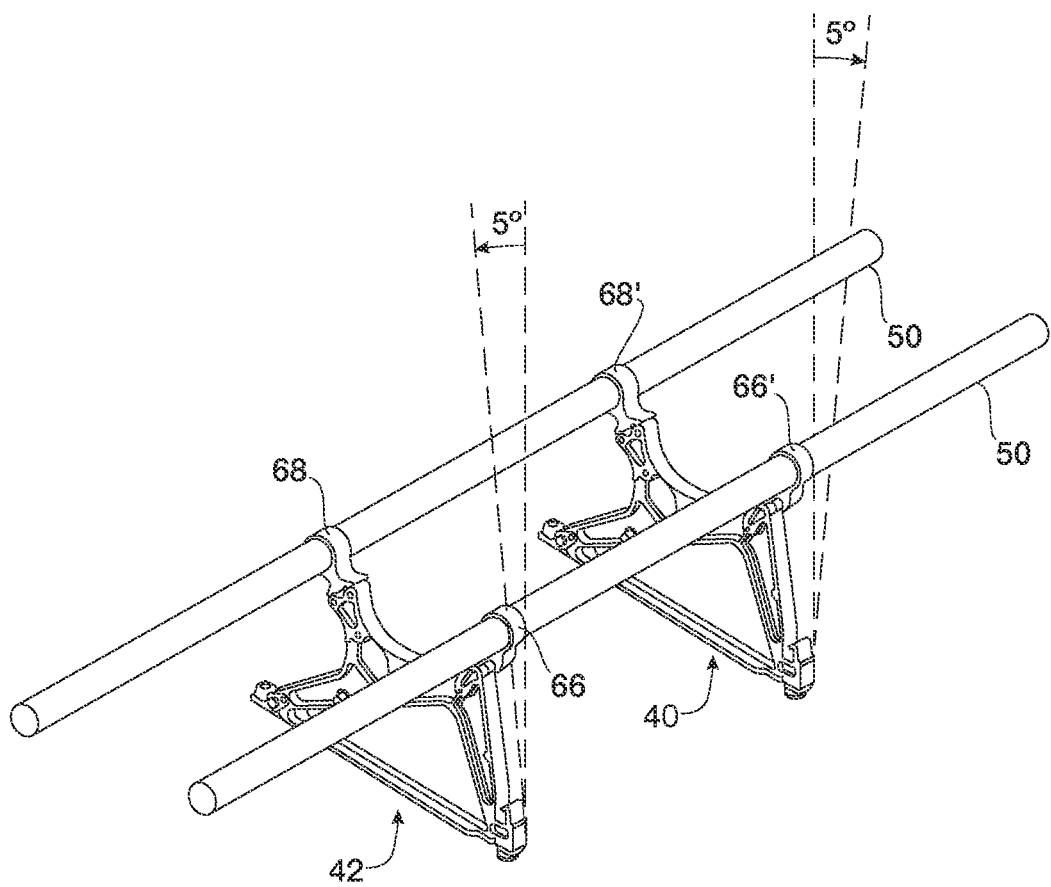

Referring now to FIGS. 8-10, the manner in which the non-perpendicular aligned joint clamps 66, 68 may be used to accommodate changes in seat spacing, such as adding wider middle seats, is illustrated. In FIGS. 8-10, the embodiment shown is canted about 5 degrees.

As noted above, spacing between parallel sets of floor tracks is generally fixed, so that the need to have seats with varying spacing in prior art constructions has been accommodated by having differently-constructed leg assemblies with various offsets to the left or right of the centerline of the leg assemblies.

By using the non-perpendicular aligned joint clamps 66, 68, seat spacing is varied using the same components except for the diagonal leg tie 64 which is changed to a canted diagonal leg tie constructed according to the present inventions, avoiding the need to provide a number of differently-constructed leg assemblies and components.

For example, in FIG. 8 the non-perpendicular aligned joint clamps 66, 68 are canted to position the leg assemblies 40, 42 inbound about 5 degrees. This permits the spreader bars 29 to be positioned in non-perpendicular alignment inbound with respect to the seat tracks. This arrangement would accommodate a slightly wider middle seat. If both were canted, it would accommodate a slightly wider window seat.

For comparison, in FIG. 9, the non-perpendicular aligned joint clamps 66', 68' are canted to position the leg assemblies 40, 42 outbound about 5 degrees. This permits the spreader bars 29 to be positioned in non-perpendicular alignment outbound with respect to the seat tracks. This arrangement would accommodate different seat place widths.

In FIG. 10, one of the pair of non-perpendicular aligned joint clamps 66, 68 is canted inbound as shown in FIG. 8 and the other pair 66', 68' is canted outbound as shown in FIG. 9. This arrangement would accommodate a still wider middle seat. Although not shown, it is also apparent that if the arrangement shown in FIG. 10 was reversed, it would accommodate a wider middle seat.

Certain modifications and improvements will occur to those skilled in the art upon a reading of the foregoing description. By way of example, the non-perpendicular aligned joint clamps could be welded or shrink fit to the spar tubes to save additional weight. It should be understood that all such modifications and improvements have been deleted herein for the sake of conciseness and readability but are properly within the scope of the following claims.

I claim:

1. A seat system for a passenger aircraft, said seat system comprising:
 (a) a passenger seat frame having
  (i) a plurality of spreader bars and (ii) a plurality of laterally extending spar tubes connecting said plurality of spreader bars to one another; and (b) at least one canted leg assembly offset a centerline about a floor tie assembly and connected to said seat frame for attachment to fixed, spaced apart attachment points on a supporting surface of said passenger aircraft, and comprising a front leg portion having a front joint clamp and an aft leg portion having a non-perpendicular aft joint clamp, and wherein said front and aft joint clamps having annular collars that receive said spar tubes and said annular collars are canted thereby to cant said leg assembly, and whereby said seat system is adapted to be laterally positioned and attached to provide different spaced apart passenger seating configurations.

2. The seat system according to claim 1 including a seat back tray table attached to the back of said passenger seat frame.

3. The seat system according to claim 2, wherein said seat back tray table attached to the back of said passenger seat frame is movable between a first storage position and a second deployed position.

4. The seat system according to claim 3 including a lock mechanism attached to the back of said passenger seat frame for retaining said seat back tray table in a secured position.

5. The seat system according to claim 1 including a display attached to the back of said passenger seat frame.

6. The seat system according to claim 5, wherein said display is adjoined by the back of said passenger seat frame.

7. The seat system according to claim 1 including a backrest support assembly including a backrest attached to one of said spreader bars.

8. The seat system according to claim 7 including a seat bottom support assembly.

9. The seat system according to claim 8 including a quadrant assembly connected between said backrest support assembly and said seat bottom support assembly comprising a quadrant member including (i) a pivot point adapted to pivot said backrest with respect to said spreader and said quadrant member; (ii) a lower point attached to said seat bottom support assembly and (iii) an upper point attached to said backrest.

10. The seat system according to claim 7, including a backrest cushion attached to the backrest support assembly.

11. In a seat system for a passenger aircraft wherein the seat system includes a passenger seat frame having (i) a plurality of spreader bars and (ii) a plurality of laterally extending spar tubes connecting said plurality of spreader bars to one another, the improvement comprising a canted leg assembly connected to said seat frame for attachment to fixed, spaced apart attachment points on a supporting surface of said passenger aircraft, said canted leg assembly offset a centerline about a floor tie and comprising:

(a) a front leg portion including a front joint clamp for receiving one of said plurality of laterally extending spar tubes in a non-perpendicular attachment point; and (b) an aft leg portion including a non-perpendicular aft joint clamp for receiving another one of said plurality of laterally extending spar tubes in a non-perpendicular attachment point, wherein said front and aft joint clamps having annular collars that receive said spar tubes and said annular collars are canted thereby to cant said leg assembly; whereby said seat system is adapted to be laterally positioned and attached to provide different spaced apart passenger seating configurations.

12. The canted leg assembly according to claim 11, wherein each of said joint clamps include an annular collar for receiving said spar tubes.

13. The canted leg assembly according to claim 12, wherein the interior portion of said annular collar is beveled off center to vertical from one side of said collar to form said non-perpendicular attachment point.

14. The canted leg assembly according to claim 13, wherein the interior portion of said annular collar is also beveled off center to vertical from the other side of said collar to form another and opposite of said non-perpendicular attachment points.

15. The canted leg assembly according to claim 11, wherein said floor tie connecting the base of said front leg portion to the base of said aft leg portion.

16. The canted leg assembly according to claim 15, wherein said floor tie assembly including a front track fitting.

17. The canted leg assembly according to claim 15, wherein said floor tie assembly including an aft track fitting.

18. A seat system for a passenger aircraft, said seat system comprising:

(a) a passenger seat frame having
(i) a plurality of spreader bars and
(ii) a plurality of laterally extending spar tubes connecting said plurality of spreader bars to one another;

(b) at least one canted leg assembly connected to said seat frame for attachment to fixed, spaced apart attachment points on a supporting surface of said passenger aircraft, said canted leg assembly comprising:

(i) a front leg portion including a front joint clamp having an annular collar for receiving one of said plurality of laterally extending spar tubes in a non-perpendicular attachment point; and (ii) an aft leg portion including an aft joint clamp having an annular collar for receiving another one of said plurality of laterally extending spar tubes in a non-perpendicular attachment point, wherein said annular collars of the front and aft joint clamps are canted thereby to cant said leg assembly; whereby said seat system is adapted to be laterally positioned and attached to provide different spaced apart passenger seating configurations; and (c) a seat back tray table attached to the back of said passenger seat frame.

\* \* \* \* \*